United States Patent
Kung et al.

(10) Patent No.: US 6,633,290 B1
(45) Date of Patent: Oct. 14, 2003

(54) APPARATUS AND METHOD FOR FORMING 2D VIEWS OF A STRUCTURE FROM 3D POINT DATA

(75) Inventors: Jonathan Apollo Kung, Oakland, CA (US); Vadim Matov, Campbell, CA (US)

(73) Assignee: Cyra Technologies, Inc., San Ramon, CA (US)

( * ) Notice: Subject to any disclaimer, the term of this patent is extended or adjusted under 35 U.S.C. 154(b) by 0 days.

(21) Appl. No.: 09/574,715

(22) Filed: May 18, 2000

(51) Int. Cl.[7] .............................................. G06T 15/00
(52) U.S. Cl. ...................................................... 345/423
(58) Field of Search ................................ 345/419, 420, 345/423, 619; 356/5.01, 141.1

(56) References Cited

U.S. PATENT DOCUMENTS

| | | | | |
|---|---|---|---|---|
| 5,638,163 A | * | 6/1997 | Nourrcier, Jr. ............. | 356/5.01 |
| 5,719,664 A | * | 2/1998 | Besesty et al. ............. | 356/5.01 |
| 6,023,326 A | | 2/2000 | Katayama et al. ....... | 356/141.3 |
| 6,048,105 A | | 4/2000 | Ohtomo et al. ................ | 385/88 |
| 6,052,181 A | | 4/2000 | Maynard et al. ............. | 356/147 |
| 6,246,468 B1 | | 6/2001 | Dimsdale .................... | 702/159 |
| 6,473,166 B1 | * | 10/2002 | Ohishi et al. ............ | 356/141.1 |
| 6,546,309 B1 | * | 4/2003 | Gazzuolo et al. ........... | 702/167 |

FOREIGN PATENT DOCUMENTS

EP      0 501 716 A2    2/1992

OTHER PUBLICATIONS

*Cyrax: Long range 3D Laser Scanner; Cyrax 2400 Specs.*; Cyra 3D Digital Reality, May 21, 1999, pp. 1–3.
*Cyrax 3D Software: Automatic 2D Extraction*; Cyra 3D Digital Reality, One page; 1999.
*New 3D Scanner Zaps Sci–Fi Movie Set*; Professional Surveyor, New Technology, Apr. 1999, pp. 5 pages.
*HP Innovations, Mapping System Lowers As–Built Survey Costs*; Hydrocarbon Processing Magazine; Oct. 1998, p. 35.
*A/E/C '98; Expanding Horizons, Bold Initiatives, An Overview Of A/E/C Systems '98*; Microstation Manager, Aug. 1998; pp. 40–43.
*Cyrax 3D Laser Scanner: Computer Aided Construction*; Cyra 3D Digital Reality ; May 21, 1999, One page.
*Cyrax Laser Scanning: Fabrication; Parts Mating Analysis*; Cyra 3D Digital Reality; May 21, 1999, One page.
*Cyrax 3D Laser Scanner: High Accuracy, Long Range, Data Capture*; Cyrax System Overview; Cyra 3D Digital Reality, May 21, 1999, pp. 1–3.

(List continued on next page.)

*Primary Examiner*—Phu K. Nguyen
(74) *Attorney, Agent, or Firm*—Stallman & Pollock LLP

(57) ABSTRACT

An apparatus and method are described for forming 2D views of a structure from 3D point data. In the present invention, a plane is specified and triangulated meshes are intersected with the plane to form a group of polylines. The significant features of each polyline are then extracted, and the features are then connected to form intersection polylines that closely approximate the intersection polylines that would be generated by intersecting the real 3D structure with the specified plane. The final 2D view consists of the connected features extracted from the polylines.

25 Claims, 5 Drawing Sheets

OTHER PUBLICATIONS

Cyrax 2400 Mark 1 3D Laser Scanner; Cyrax 2400, Cyra 3D Digital Reality, May 21, 1999, pp. 1–2.

L. Edwards et al., "The Cutplane: A Tool for Interactive Solid Modeling," *SIGCHI Bulletin*, vol. 20, No. 2, Oct. 1988, pp. 72–77.

"Notification of Transmittal of the International Search Report or the Declaration," mailed Dec. 13, 2002, in Appln. No. PCT/US01/13434, Int'l Filing Date Apr. 27, 2001, 6 pages in length.

*A Technical Leap In Robotic Programming May Be On The Horizon*; by Andrew Cullison; Welding Journal, Jul. 1998; pp. 49–52.

*Rapid Laser Scanner Heralds New Advance In Terrestrial Survey*; Engineering Surveying Showcase; Apr. '99, p. 16.

*Product Bulletin*; Cyra Technologies, Inc. May 18, 1999, 6 pages.

*New Equipment, Supplies and Sevices*; Cyra Technologies Inc. Point Of Beginning (POB) Magazine; Dec. 1998, p. 66.

*Products, People, Places; 3D Laser Mapping System*; Professional Surveyor Magazine; Nov./Dec. 1998, p. 62.

*Products, 3–D Laser Mapping System; New Equipment Digest*; Nov. 1998, p. 76.

*Front Page, Laser & Optronics; Laser Profiling Package*; Oct. 1998, p. 1.

*Literature & Products, Imaging System; Power Engineering Magazine*, Oct. 1998, p. 72.

*Showcase, 3–D Laser Mapping; GPS World Magazine*, Dec. 1998 Issue, vol. 9; p. 48.

\* cited by examiner

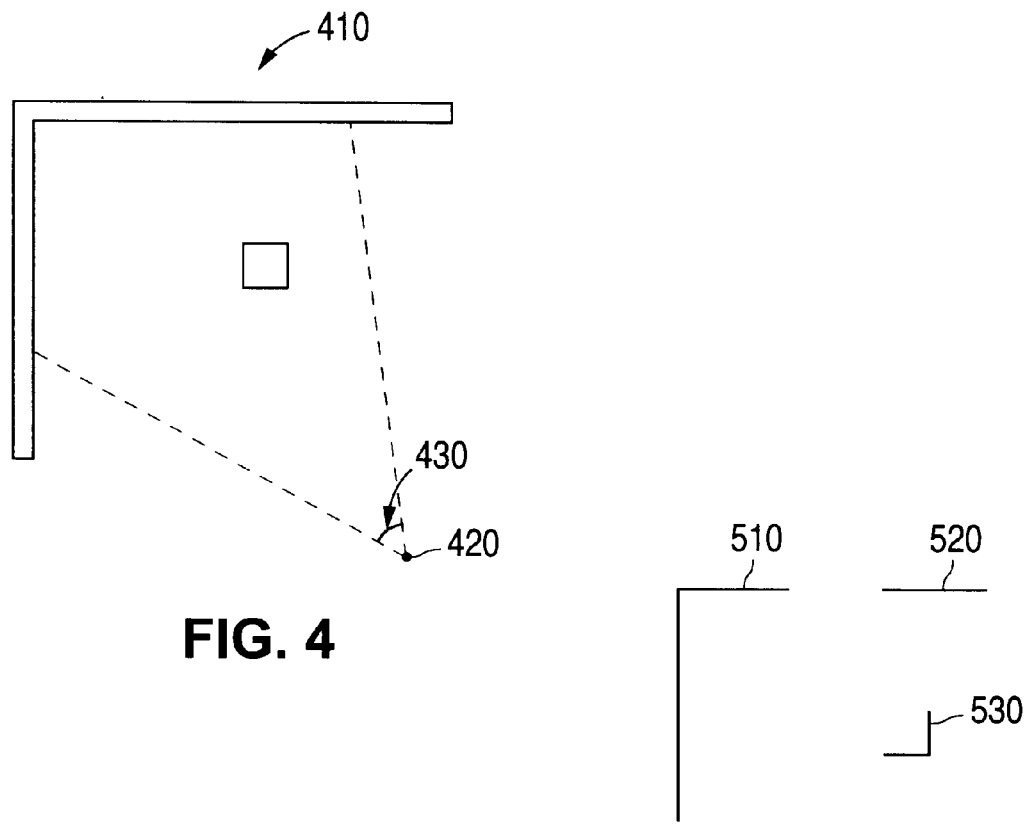
FIG. 4
FIG. 5
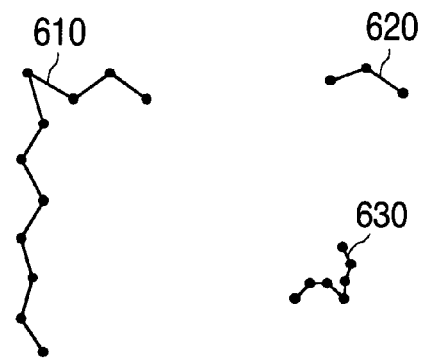
FIG. 6A
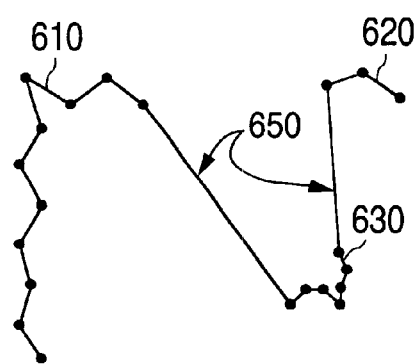
FIG. 6B

APPARATUS AND METHOD FOR FORMING 2D VIEWS OF A STRUCTURE FROM 3D POINT DATA

BACKGROUND OF THE INVENTION

1. Field of the Invention

The present invention relates to an apparatus and method for forming 2D views of a structure and, more particularly, to an apparatus and method for forming 2D views of a structure from 3D point data.

2. Description of the Related Art

It is often desirable to have computer models that represent the as-built configuration of large physical structures, such as a petroleum refinery. The computer models are constructed by acquiring geometric information about the to-be-modeled structure. One technique for acquiring the geometric information is to use a laser scanning system. In a laser scanning system, the to-be-modeled structure is scanned with a laser from a plurality of views.

Each scan includes a plurality of scan points that cover a view of the structure. Each scan point has a measured location in 3D space (3D point data), usually in terms of an (x,y,z) point in the scanner's local coordinate system, or a transformed coordinate system. In some cases, the 3D point data also includes data that indicates the intensity of the laser light reflected from the point.

When a view is scanned, the laser scanning system generates 3D point data for a large number of points. The collection of scan points from one or more scans is often called a scan cloud. The scan cloud typically has points that lie on many different surfaces, depending on the view that was scanned. For example, a scan taken at a petroleum refinery may include a point cloud that has points on pipes, elbows, valves, pumps, and structural steel members.

Once each view of the structure has been scanned, a triangulated mesh that joins the 3D point data can be formed using any number of well-known techniques. When the mesh is rendered on a computer display it provides more feedback to the user about the surfaces in the view than when the points alone are viewed. The mesh looks more like the real surfaces that were scanned, and foreground meshes occlude distant meshes. It should be noted that foreground points do not occlude. background points, so points are always in view. Therefore, triangulated meshes are very useful for visualization purposes.

If geometric data is needed rather than simple visualization, the 3D point data can be processed to form a 3D model of the structure. In addition to the 3D model of the structure, it is often desirable in architecture, engineering, and construction applications to create 2D views of the 3D point data in particular projections, such as plan views or elevation views. The 2D views are relatively straightforward to create from a 3D model of the structure, but are extremely difficult to create from the 3D point data that are used to form the 3D model of the structure.

If the time required to create a model of a structure is divided between a first data gathering step, where the structure is physically scanned to produce the 3D point data, and a second data processing step, where the 3D point data is processed to form the model, the data processing step would require significantly more time. As a result, the data processing step is a significantly more expensive step to complete than the data gathering step.

Thus, due to the high cost of the data processing step, and the difficulty associated with utilizing the 3D point data directly, it is often cost prohibitive to laser scan a structure for the sole purpose of generating 2D views of the structure. Thus, there is a need for an apparatus and method that easily form 2D views of a structure from the 3D point data.

SUMMARY OF THE INVENTION

The present invention provides an apparatus and method that form 2D views of a 3D structure. The apparatus of the present invention includes means for forming a number of intersection polylines. The intersection polylines have groups of polyline points such that each intersection polyline has a group of polyline points. The apparatus also includes means for forming a sequence of features from each group of polyline points. The apparatus further includes means for joining consecutive features in each group of polyline points to form a 2D view.

The method of the present invention includes the step of forming a number of intersection polylines. As above, the intersection polylines have groups of polyline points such that each intersection polyline has a group of polyline points. The method also includes the step of forming a sequence of features from each group of polyline points. The method further includes the step of joining consecutive features in each group of polyline points to form a 2D view.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIG. 4 is a plan view of the intersection of the plane 210 with the 3D structure 200, shown together with the location of a laser scanning device, in accordance with the present invention.

FIG. 5 is a plan view that illustrates a portion of the total 3D intersection polyline 410 that is visible from the sample scanner location in accordance with the present invention.

FIG. 6A shows a plan view that illustrates a noisy version of the visible portion of the total intersection polyline 410 in accordance with the present invention.

FIG. 6B is a plan view that illustrates false polyline segments 650 (corresponding to false mesh triangles) that connect polylines 610, 620, and 630 in accordance with the present invention.

DETAILED DESCRIPTION

Figure 1:
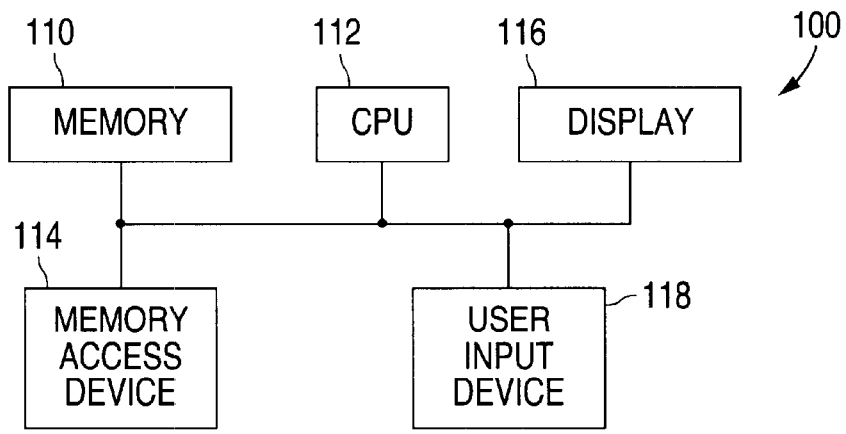
FIG. 1 is a block diagram illustrating a computer 100 in accordance with the present invention.

FIG. 1 shows a block-diagram that illustrates a computer 100 in accordance with the present invention. As described in greater detail below, the present invention provides an apparatus and method for forming 2D views of a structure from 3D point data by growing and joining lines from the points where the mesh lines of a triangulated mesh intersect a plane of interest.

As shown in FIG. 1, computer 100 includes a memory 110 that stores program instructions, 3D point data, and 2D view data. The 3D point data includes 3D location information, typically given as (x,y,z) coordinates in the scanner's local coordinate system, or a transformed coordinate system.

As further shown in FIG. 1, computer 100 also includes a central processing unit (CPU) 112 that is connected to memory 110. CPU 112 generates the 2D view data by processing the 3D point data in response to the program instructions and input from a user.

Further, computer 100 includes a memory access device 114, such as a disk drive or a networking card, which is connected to memory 110 and CPU 112. Memory access device 114 allows the program instructions to be transferred to memory 110 from an external medium, such as a disk or a networked computer. In addition, device 114 allows the 3D point data or the 2D view data from memory 110 or CPU 112 to be transferred to the external medium.

In addition, computer 100 includes a display system 116 that is connected to CPU 112. Display system 116 displays images to the user which are necessary. for the user to interact with the program. Computer 100 also includes a user-input device 118, such as a keyboard and a pointing device, which is connected to CPU 112. The user operates input device 118 to interact with the program.

Figure 2:
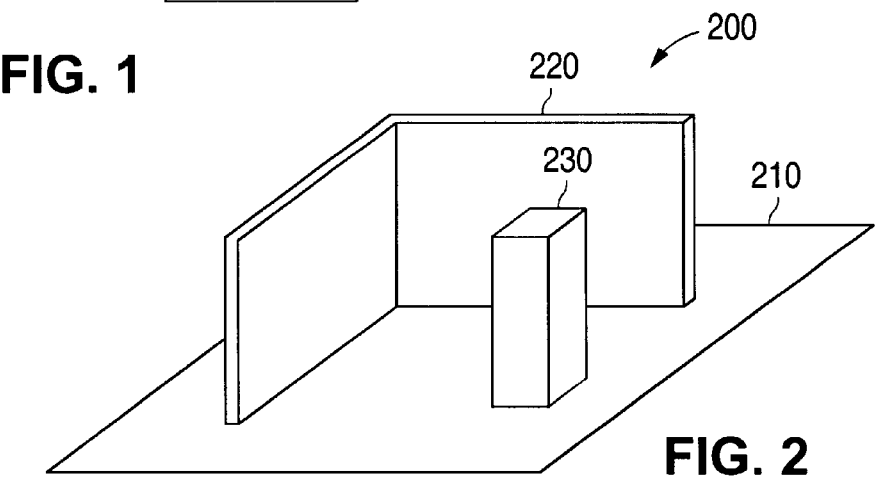
FIG. 2 is a view of a sample 3D structure 200 and a user-specified plane 210 that illustrates the operation of the present invention.

FIG. 2 shows a perspective view of a sample 3D structure 200 and a plane of interest 210 that illustrates the operation of the present invention. As shown in FIG. 2, structure 200 includes a L-shaped wall 220 and a column 230 that is positioned in front of the wall 220. The plane of interest 210 intersects the wall 220 and the column 230. Structure 200 is used as an example to illustrate the invention, but the details of the invention apply to any configuration of a structure. The specific example is not intended to limit the invention, but rather to illustrate the operation of the invention.

Figure 3:
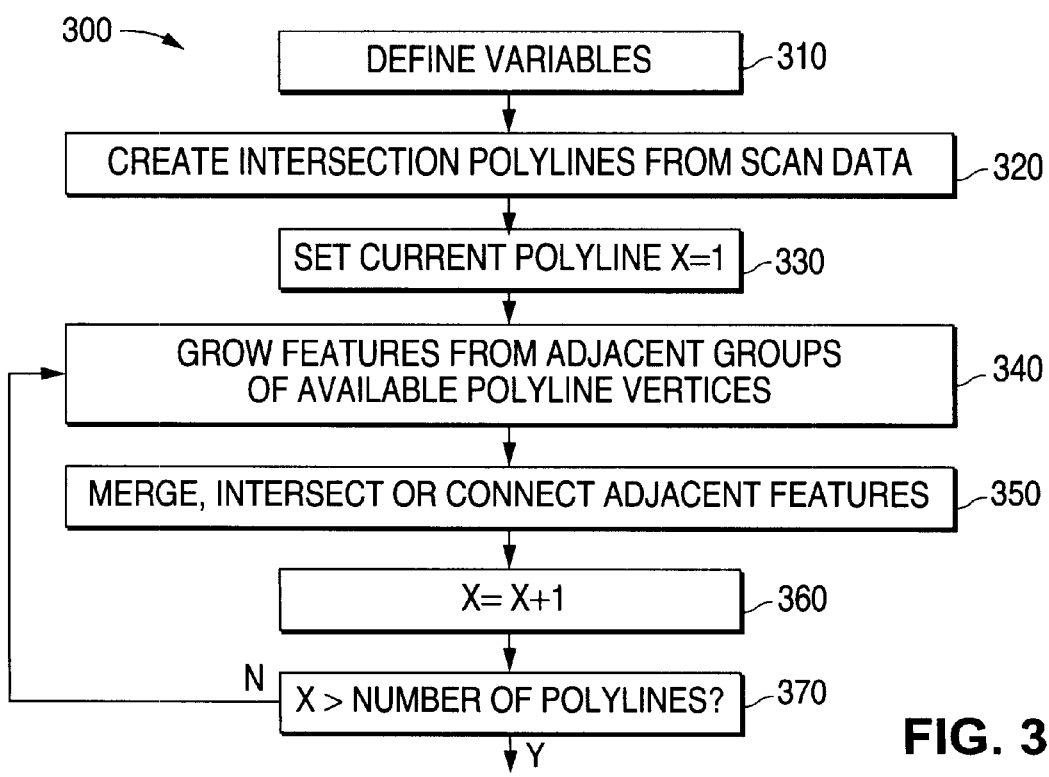
FIG. 3 is a flow chart illustrating a method 300 for forming 2D views of a structure from 3D point data in accordance with the present invention.

FIG. 3 shows a flowchart that illustrates a method 300 in accordance with the present invention. As shown in FIG. 3, method 300 begins with step 310 where the user defines a number of variables, selects a view of the scan data, and specifies an orientation for intersection plane 210. The user must specify the plane of interest 210 completely, including its position and orientation. The specified plane becomes the drawing plane for the 2D view produced by the present invention. The plane of interest 210, which completely specifies the desired 2D view, can be positioned and oriented by the user in any number of ways, including the use of graphical manipulation, to a view that is interesting to the user. The plane 210 may be aligned to the scan data coordinate system, or to the current viewing direction, or any other alignment that provides the user with the desired 2D view.

The 2D view is determined by the location and orientation of the intersection plane, as shown in the following example. FIG. 4 shows a plan view that illustrates the intersection of the plane 210 with structure 200. As shown in FIG. 4, the resulting intersection of plane 210 with the wall 220 and the column 230 gives an intersection polyline 410. FIG. 4 also shows a sample scanner location 420, and indicates the scanner's field of view 430 from the specified location 420. As further shown in FIG. 4, the entire intersection polyline 410 is not visible from a single scanner location. The example used to illustrate the invention will use a single scanner location 420, but the invention is applicable to point data collected from any number of scanner locations.

FIG. 5 shows a plan view that illustrates a portion of the total intersection polyline 410 that is visible from the sample scanner location 420. As shown in FIG. 5, intersection polyline 410 includes visible intersection polylines 510, 520 and 530 (what can actually be seen from location 420). The intersection polylines described by 410, as well as 510, 520 and 530, are all intersections of the real structure 200 with the specified plane 210.

When structure 200 is scanned to create a scan cloud, each point in a scan contains measurement errors (noise) that are a characteristic of the measuring device. The intersection polylines created using measured scan data will contain many segments since the segment count is related to the density of they scan, and the polylines will also contain noise since they are derived from scan points. FIG. 6A shows a plan view that illustrates a noisy version of the visible portion of the total intersection polyline 410. As shown in FIG. 6A, polylines 610, 620, and 630 represent polylines 510, 520, and 530, respectively, with measurement noise.

The object of the present invention is to convert the intersection polylines, such as polylines 610, 620 and 630, into a representation that closely approximates the real plane intersection polylines, such as polylines 510, 520 and 530. The example shown here includes linear features, although other shapes, such as circular arcs, are easily considered, as discussed later.

In step 320, the scan data and intersection plane 210 are used to produce a collection of intersection polylines, such as polylines 610, 620 and 630. The remainder of the invention is performed in 2D even though the scan data was in 3D, since the intersection with the plane reduces the data to a collection of 2D polylines. There are many well-known ways to create the polylines described in step 320 from a 3D scan cloud data and an intersection plane 210.

In a first embodiment of step 320, the scan cloud is converted to a triangular mesh representation, using any of the well-known triangulation methods. The resulting mesh triangles use the original 3D scan points as vertices. Many of the resulting mesh triangles are close representations of the real surfaces of wall 220 and column 230 in the vicinity of the scan points. However, there may also be triangles, known as false triangles, which do not represent a real surface, such as triangles that span from points on the wall 220 to points on the column 230.

Any one of many well-known methods can be used to remove triangles that do not correspond to real surfaces. These well known methods use information such as triangle orientation relative to the scanner position and triangle shape to decide which triangles are not likely to correspond to a real surface. Once false triangles have been removed, the resulting triangulated mesh will be a close approximation to the visible surfaces of wall 220 and column 230, although measurement noise will be present in the scan data, and therefore in the scan mesh as well. Straightforward geometric methods can be used to intersect the mesh with the intersection plane 210 to give a collection of polylines, such as 610, 220 and 630.

If the false triangles are not removed from the original scan meshes, as discussed previously, then polylines 610, 620, and 630 appear to be connected. FIG. 6B shows a plan view that illustrates false polyline segments (corresponding to false triangle in the mesh) that connect polylines 610, 620, and 630 in accordance with the present invention.

As shown in FIG. 6B, when the plane 210 intersects the scan mesh, and false triangles are not removed, the false triangles produce false polyline segments 650 that connect the polylines 610, 620 and 630. In the present invention, in addition to removing false triangles from the scan mesh as described above, polyline segments corresponding to false triangles can also be removed after the plane 210 has been intersected into the mesh by removing lines 650.

It is often straightforward to identify and remove lines 650, resulting in the desired collection of polylines 610, 620 and 630. For example, many scanners collect data at a regular interval, and if there are segments 650 that have lengths greater than the expected spacing, then these segments can be removed. The expected spacing between adjacent points may vary with range to the scanner location, as points further from the scanner may have larger spacing between adjacent points. It is generally straightforward to determine the expected spacing between a pair of adjacent point locations.

When using other methods to create intersection polylines, as described below, care must be taken to remove line segments that do not correspond to a real surface intersection, since the extent of the intersection polyline is taken to represent the real intersection. This is easily done by setting a distance threshold that defines the maximum distance between points that will be connected by a line segment, and setting the distance threshold to be consistent with the actual scan density.

In a second embodiment of step 320, all of the scan points within some user specified distance tolerance of the intersection plane 210 can be projected into the intersection plane, to give a collection of 2D points. Any one of many well know methods can then be used to connect the 2D points that are close together to form a collection of polylines with nonintersecting segments, such as 610, 620 and 630.

In third and fourth embodiments of step 320, which are described below, two or more parallel intersection planes are defined, although a single 2D drawing plane is used to collect the intersection data. The drawing plane can be conveniently taken as the first intersection plane, since the 2D result does not depend on which of the parallel intersection planes is used as a drawing plane. With multiple intersection planes additional 3D data can be converted into the 2D view in a single pass.

For example, if a 2D view describing the floor plan of a room is to be extracted, one intersection plane could be defined at one foot above the floor level so that the intersection with that plane gave information about cabinets that extend up from the floor level at least one foot. A second intersection plane could be defined one foot from the ceiling so that the intersection with that plane gave information about the ventilation ducts that extend below the ceiling. In this way, any number of intersection planes can be added to cut through the interesting features that are to be projected into 2D.

In the third embodiment of step 320, the mesh intersection method described in embodiment one is used for each intersection plane to form collections of polylines, and then all of the polyline vertices are projected into the 2D drawing plane. Any one of many well-known methods can then be used to connect the 2D points that are close together to form a collection of polylines with nonintersecting segments, such as 610, 620 and 630.

In the fourth embodiment of step 320, the points within a user specified distance tolerance of each of the intersection planes are all projected into the drawing plane to give a collection of 2D points. Any one of many well-known methods can then be used to connect the 2D points that are close together to form a collection of polylines with nonintersecting segments, such as 610, 620 and 630.

To create a sequence of features, such as line segments or circular arcs, method 300 moves to step 330 where a polyline from the group, such as polyline 610, is selected to be a current polyline which, in turn, is defined to be a first polyline. For the current polyline, step 340 then grows a number of features from the group of points that form the current polyline. The details of step 340 are presented in FIG. 7.

Figure 7:
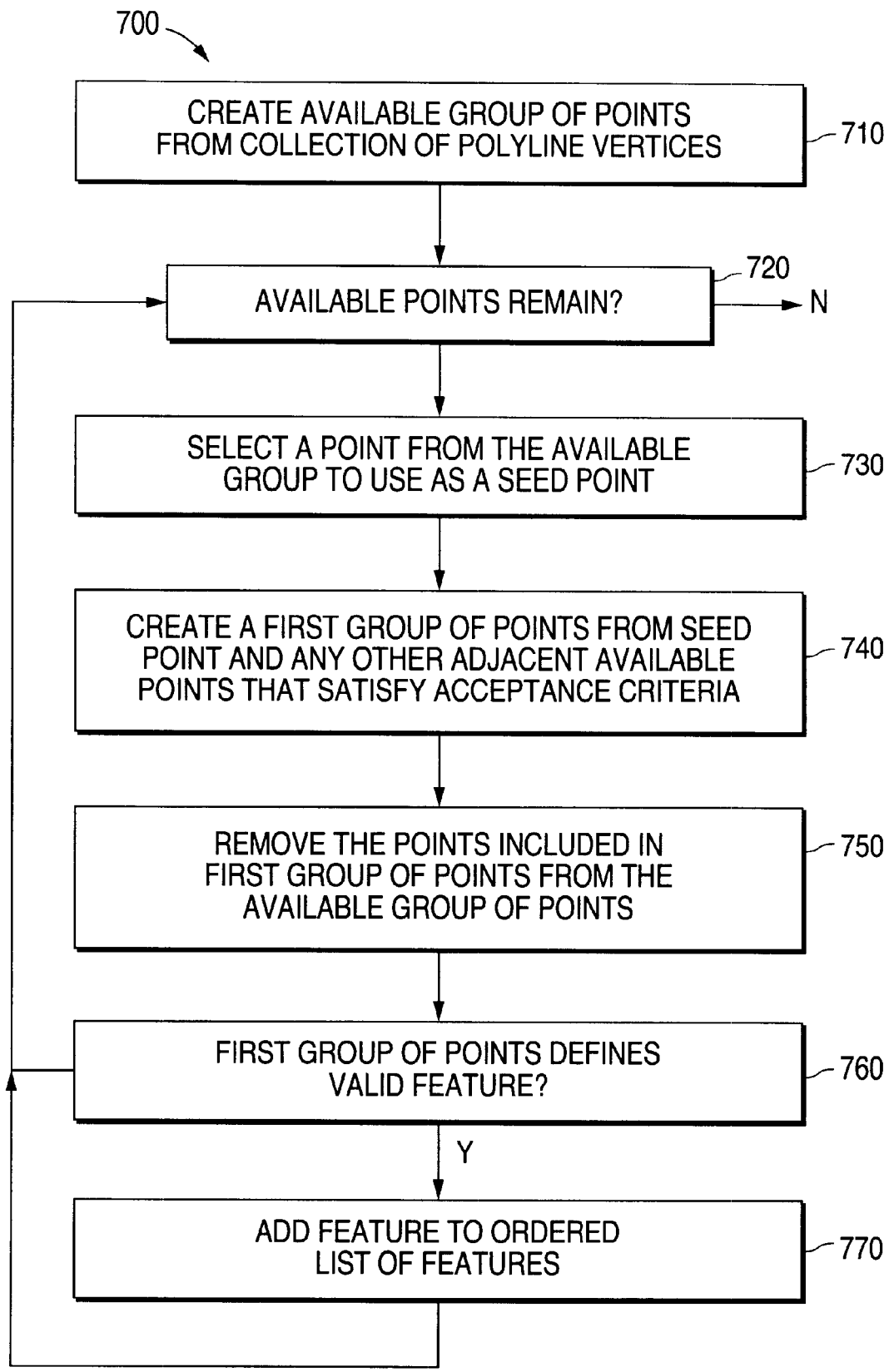
FIG. 7 is a flow chart illustrating a method 700 for growing features from intersection polyline data in accordance with the present invention.

FIG. 7 shows a flowchart that illustrates a method 700 for growing features from a polyline in accordance with the present invention. As shown in. FIG. 7, method 700 begins in step 710 by creating an available group of points, initially consisting of all of the vertices in the current polyline. For example, if polyline 610 is selected to be the first polyline, then all of the points that form polyline 610 are used to form the available group of points.

In step 720, a test is made to see if there are points in the available group, and if there are no more points, method 700 completes and processing continues with step 350 of method 300. If points remain in the available group, then processing continues with step 730 where a point from the available group is selected as a seed point. In the preferred embodiment of the invention a random point from the available group is selected as the seed point, although the seed point could be selected in other ways, such as sequentially through an available points list.

In step 740, method 700 collects a first group of points that correspond to a feature of the real structure 200, where a feature is a single straight line segment, or single other shape such as a circular arc. The seed point selected from the available group of points is added to the first group of points. After this, step 740 investigates the points neighboring the seed point along the polyline, and performs an acceptance test (using variables defined in step 310) for each additional point considered.

Figure 8A:
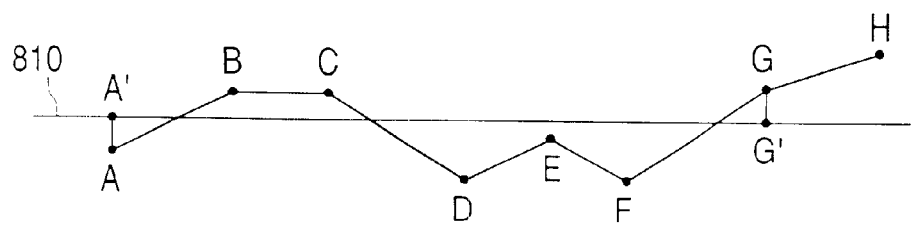
FIGS. 8A–8B are views illustrating the growing of features from a polyline description in accordance with the present invention.

In the preferred embodiment, step 740 investigates points alternately from either side of the seed point. FIG. 8A shows an example sequence of points on a polyline in accordance with the present invention. As shown in FIG. 8A, if point D is the seed point, the next point to investigate could be point E, then C, then F, then B, alternating back and forth so long as the new points pass the acceptance test.

The acceptance test includes four parameters. Three of the parameters are used to decide on the acceptability of each new point that is considered, and one parameter is used to decide on the acceptability of the new feature overall. The three acceptability parameters include the maximum allowable mean square distance between the points in the current point group and the corresponding best fit line segment.

In addition, the three parameters also include the maximum allowable absolute distance between the furthest point in the current point group and the corresponding best fit line segment, and the maximum allowable relative error, given as the maximum absolute error divided by the line segment length. The overall parameter includes the minimum length of the final feature. There is a first set of these four acceptance criteria parameters that are used to grow features from polylines as described later, and a second set of these four acceptance criteria parameters that are used to join adjacent features, as described later. The second set of acceptance criteria parameters can be conveniently set equal to the first set.

If the acceptance test passes, the point under investigation is added to the first group of points. If the acceptance test fails the point under investigation is not added to the first group of points and no further polyline points on that side of the seed point are investigated. If the end of the polyline is reached during the search for acceptable neighboring points, such as point A in FIG. 8A, then no additional points. can be added in that direction.

Considering again the same sequence of test points, if point F failed the acceptance test, then point F would not be included in the first group of points and points beyond F, namely G and H, would not be examined since the feature includes only sequential groups of points. The final way to terminate a search for acceptable points is to reach a portion of the polyline where points are no longer available because they have been used to grow a feature during a previous application of step. 740 on the current polyline.

Figure 9:
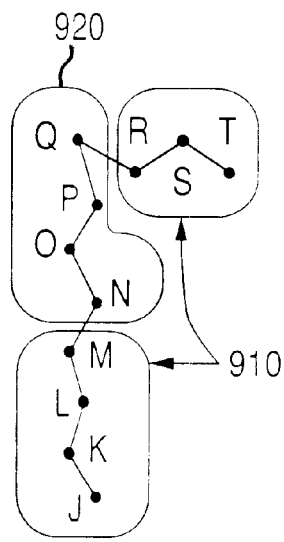
FIG. 9 illustrates groups of available and used points along a polyline in accordance with the present invention.

For example, points 910 in FIG. 9 are points that have had features grown already by previous application of step 740. Points 920 are still available and, as an example, point 0 will be considered a seed point. The extent of the search for a feature growing from seed point 0 will be between points N and Q, since points M and R are no longer on the available list, after being removed when the associated feature was recognized in a previous application of step 740.

To evaluate the acceptance criteria, the points in the first group of points that were previously accepted, together with the current point under investigation, are grouped to form a current group of points, such as points A through G in FIG. 8A. The current group of points are then fit with a best fit line, such as line 810, using well-known fitting methods. The acceptance test compares the three user specified acceptance criteria parameters, namely maximum mean square error, maximum absolute error and maximum relative error, to the actual distances between each point in the first group of points together with the current point and the corresponding best fit line.

If the distances between the first group of points together with the current point and the corresponding best fit line satisfy the acceptance criteria, the current point under investigation is added to the first group of points. If the best fit line fails to satisfy the acceptance criteria, then the failed point and each other point separated from the seed point by the failed point are left in the available group of points.

Once all of the adjacent available points that satisfy the acceptance criteria have been added to the first group of points, method 700 moves to step 750 to remove the points that are in the first group of points from the available group of points. As a result, the only points left in the available group of points are those points which have not yet been examined in a feature growing step, or points that failed to satisfy the acceptance criteria.

Figure 8B:

In step 760, the fourth user specified acceptance parameter is used to see if the feature (line segment) is large enough, by testing to see if the feature length associated with the first group of points (what was just previously the current group of points) is longer than the user specified minimum. For a line segment, the line segment length needed for the relative error comparison is calculated by projecting the current points onto the corresponding best fit line, and taking as line segment endpoints the point projections that produce the longest line segment. For example, in FIG. 8B, line segment 820 is formed by projecting point A to point A', and point G to point G' if the current point group includes points A through G.

If the feature is not large enough (if line segment 820 is too short), then no feature is added and processing moves back to step 720. If the feature (line segment 820) is large enough, the feature is added to an ordered list of features in step 770. Once the new feature has been added to the ordered feature list processing moves back to step 720.

Once method 700 is completed, all available points in the current polyline have been examined, and an ordered feature list has been created. In step 350 the ordered feature list is processed to form a final polyline that should closely describe the intersection polylines between the real structure, such as wall 220 and column 230, and the user specified plane 210.

In step 350 the ordered sequence of features can be joined in several ways, and step 350 considers three joining methods in order, merging, intersection and then connecting. Only adjacent features in the ordered list of features are considered in this process.

First, the entire ordered list of features is processed to merge appropriate adjacent features. Then the resulting ordered list is processed to intersect appropriate adjacent features, and finally, the resulting ordered list of features is processed to conned the adjacent features that were not joined by merging or intersection.

The first joining method, a merge, attempts to determine if adjacent features are in fact a single feature that was not properly recognized because of noise in the original polyline data. In the case of linear segments the merge test is essentially a collinearity test. A potential merge is performed by taking the original polyline vertices associated with both of the features under consideration, and attempting to fit a new feature and seeing if the new feature satisfies the second user specified acceptance criteria.

Figure 10A:
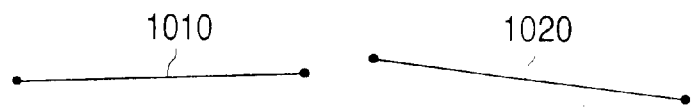
FIGS. 10A–10B are views illustrating feature merging in accordance with the present invention.
Figure 10B:
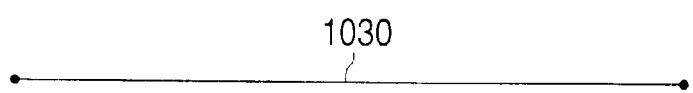

If the merged feature passes the acceptance test, then the original two features in the ordered list of features are replaced by a new merged feature. For example, FIG. 10A shows that adjacent features 1010 and 1020 are nearly collinear, and if the new feature 1030 passes the acceptance test, then features 1010 and 1020 would be replaced by feature 1030, as shown in FIG. 10B.

Figure 11A:
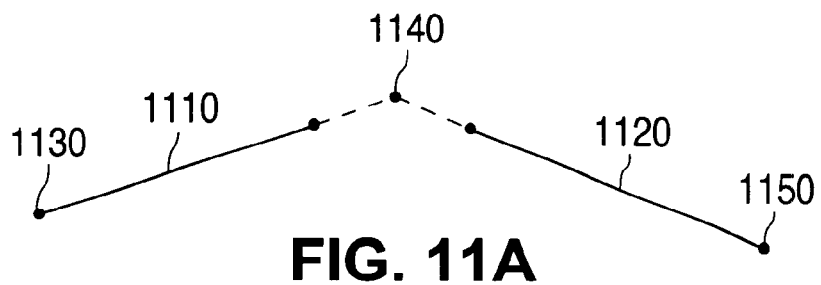
FIGS. 11A–11B are views illustrating feature intersection in accordance with the present invention.
Figure 11B:
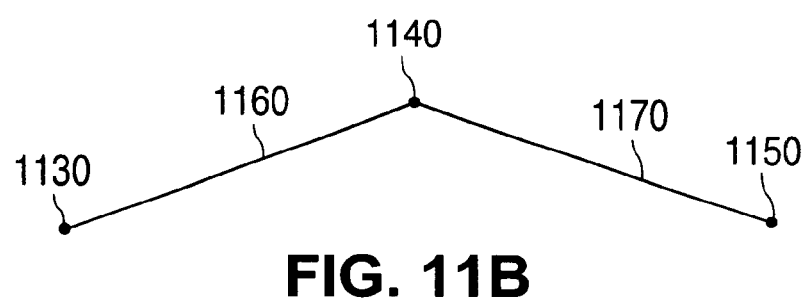

Next, adjacent features are tested to see if they should be joined by intersection. FIG. 11A shows features 1110 and 1120, as well as an intersection point 1140 that is defined by extending feature 1110 and/or 1120. If the intersection point lies between the extreme endpoints of the features, namely 1130 and 1150, then the intersection step proceeds be replacing features 1110 and 1120 with intersected features 1160 and 1170 as shown in FIG. 11B. If the intersection point 1140 does not lie between the extreme end points of 1110 and 1120 then the two features being considered are not intersected and the next pair of features is examined.

Figure 12A:
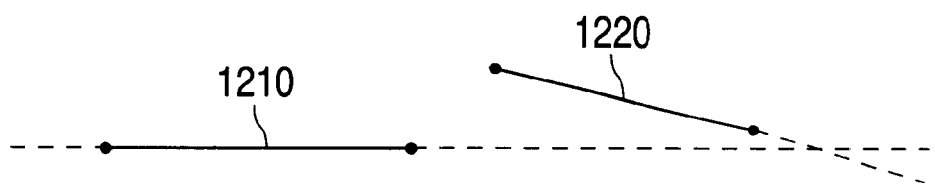
FIGS. 12A–12B are views illustrating feature connection in accordance with the present invention.
Figure 12B:
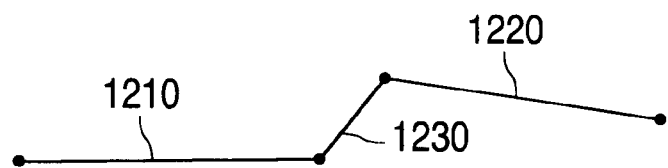

Finally, adjacent features that have not been joined by merging or by intersection are connected by adding a new segment. For example, FIG. 12A shows features 1210 and 1220 which are neither mergeable nor intersectable in accordance with the present invention. As shown in FIG. 12B, a new segment 1230 is added to join the two adjacent segments 1210 and 1220 so that a continuous polyline is formed.

Once step 350 is completed, the processing for the current polyline is complete. The connected set of features produced at the end of step 350 closely approximate the desired real intersection polylines. The polyline number is then incremented in step 360 and tested against the number of available polylines in step 370. If additional polylines remain then processing moves to step 340, otherwise processing stops and method 300 is completed.

The preceding description of the present invention has used straight features to illustrate the operation of the invention, although the invention can be used with other feature shapes as well. For example, if straight segments and circular arcs were included, then the feature growing phase in step 740 would attempt to grow each of the feature types, and select as the result the feature that consumed the most points from the available pool.

The user acceptance criteria are applicable to testing any feature shape, so the acceptance test would proceed as described above. Finally, in the joining step 350, only adjacent features of the same type would be considered for merging, although any adjacent feature types could be intersected or connected.

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. An apparatus for forming 2D views of a 3D structure, the apparatus comprising:
   means for identifying a number of intersection polylines, the intersection polylines having groups of polyline points such that each intersection polyline has a group of polyline points;
   means for forming a sequence of features from each group of polyline points, wherein a feature is a geometric shape selected from a group of geometric shapes, wherein the group of geometric shapes includes line segments and arcs, and wherein operation of the means for forming reduces a measurement noise; and
   means for joining consecutive features in each group of polyline points to form a 2D view.

2. An apparatus for forming 2D views of a 3D structure, the apparatus comprising:
   means for identifying a number of intersection polylines, the intersection polylines having groups of polyline points such that each intersection polyline has a group of polyline points;
   means for forming a sequence of features from each group of polyline points;
   means for joining consecutive features in each group of polyline points to form a 2D view; and
   wherein the means for identifying a number of intersection polylines includes:
      means for forming a mesh representation from a 3D scan cloud, the mesh representation having a plurality of mesh lines that form a plurality of triangles;
      means for identifying false triangles in the plurality of triangles, and removing any identified false triangles to form a number of meshes;
      means for inserting a first plane into the number of meshes to identify the intersection polylines.

3. The apparatus of claim 2 and further comprising means for inserting additional planes into the number of meshes to identify the intersection polylines.

4. An apparatus for forming 2D views of a 3D structure, the apparatus comprising:
   means for identifying a number of intersection polylines, the intersection polylines having groups of polyline points such that each intersection polyline has a group of polyline points;
   means for forming a sequence of features from each group of polyline points;
   means for joining consecutive features in each group of polyline points to form a 2D view; and
   wherein the means for identifying a number of intersection polylines includes:
      means for forming a mesh representation from a 3D scan cloud, the mesh representation having a plurality of mesh lines that form a plurality of triangles;
      means for inserting a plane into the mesh representation to define a continuous polyline that has a number of intersection points such that each place where a mesh line intersects the plane defines an intersection point, each pair of adjacent intersection points having a spacing; and
      means for breaking the continuous polyline into the number of intersection polylines by breaking the continuous polyline each time the spacing between adjacent intersection points exceeds a predefined value.

5. An apparatus for forming 2D views of a 3D structure, the apparatus comprising:
   means for identifying a number of intersection polylines, the intersection polylines having groups of polyline points such that each intersection polyline has a group of polyline points;
   means for forming a sequence of features from each group of polyline points;
   means for joining consecutive features in each group of polyline points to form a 2D view; and
   wherein the means for identifying a number of intersection polylines includes:
      means for forming a mesh representation from a 3D scan cloud, the mesh representation having a plurality of mesh lines that form a plurality of triangles;
      means for inserting a plane into the mesh representation;
      means for identifying scan points within a specified distance of the plane as identified points; and
      means for connecting the identified points to form the number of intersection polylines.

6. An apparatus for forming 2D views of a 3D structure, the apparatus comprising:
   means for identifying a number of intersection polylines, the intersection polylines having groups of polyline points such that each intersection polyline has a group of polyline points;
   means for forming a sequence of features from each group of polyline points; and
   means for joining consecutive features in each group of polyline points to form a 2D view; and
   wherein the means for forming includes:
      means for examining each group of polyline points in a first order to form a sequence of examined groups of polyline points;
      for an examined group of polyline points, means for placing the polyline points from the examined group of polyline points into a sequence of point sets; and
      means for forming the sequence of features from the sequence of point sets by forming a feature from the polyline points in each point set.

7. The apparatus of claim 6 wherein the means for placing includes:
  means for forming a point set of the sequence of point sets by identifying a seed point and a number of remaining points in an examined group of polyline points, the seed point defining a first member of the point set;
  means for examining the remaining points in a second order to form a sequence of examined points; and
  for an examined point, means for fitting a line to the examined point and each member in the point set, adding the examined point to the point set when the line satisfies a fit criteria, and leaving the examined point and any remaining points that are separated from the seed point by the examined point in the examined group of polyline points when the line fails to satisfy the fit criteria.

8. An apparatus for forming 2D views of a 3D structure, the apparatus comprising:
  means for identifying a number of intersection polylines, the intersection polylines having groups of polyline points such that each intersection polyline has a group of polyline points;
  means for forming a sequence of features from each group of polyline points;
  means for joining consecutive features in each group of polyline points to form a 2D view; and
  wherein the means for joining consecutive features includes:
    means for merging two adjacent features to form a single feature, each adjacent feature having an inner endpoint and an outer endpoint, the inner endpoints of the two adjacent features lying closest together, the outer endpoints of the two adjacent features lying furthest apart;
    means for testing the single feature to determine if the single feature satisfies a fit criteria; and
    means for returning the single feature to two de-merged adjacent features when the fit criteria fails.

9. The apparatus of claim 8 and further including:
  means for identifying the outer endpoints of the two de-merged adjacent features;
  means for identifying an intersection point between the two de-merged adjacent features; and
  means for extending each de-merged feature to include the intersection point when the intersection point lies between the outer endpoints.

10. The apparatus of claim 9 and further comprising means for forming a segment connected to the inner endpoints of the adjacent features when the intersection point lies outside of the outer endpoints.

11. An apparatus for forming 2D views of a 3D structure from a number of intersection polylines, the intersection polylines having groups of polyline points such that each intersection polyline has a group of polyline points, the apparatus comprising:
  means for forming a sequence of features from each group of polyline points, wherein a feature is a geometric shape selected from a group of geometric shapes, wherein the group of geometric shapes includes line segments and arcs, and wherein operation of the means for forming reduces a measurement noise; and
  means for joining consecutive features in each group of polyline points to form a 2D view.

12. An apparatus for forming 2D views of a 3D structure from a number of intersection polylines, the intersection polylines having groups of polyline points such that each intersection polyline has a group of polyline points, the apparatus comprising:
  means for forming a sequence of features from each group of polyline points; and
  means for joining consecutive features in each group of polyline points to form a 2D view; and
  wherein the means for forming includes:
    means for examining each group of polyline points in a first order to form a sequence of examined groups of polyline points;
    for an examined group of polyline points, means for placing the polyline points from the examined group of polyline points into a sequence of point sets; and
    means for forming the sequence of features from the sequence of point sets by forming a feature from the polyline points in each point set.

13. The apparatus of claim 12 wherein the means for placing includes:
  means for forming a point set of the sequence of point sets by identifying a seed point and a number of remaining points in an examined group of polyline points, the seed point defining a first member of the point set;
  means for examining the remaining points in a second order to form a sequence of examined points; and
  for an examined point, means for fitting a line to the examined point and each member in the point set, adding the examined point to the point set when the line satisfies a fit criteria, and leaving the examined point and any remaining points that are separated from the seed point by the examined point in the examined group of polyline points when the line fails to satisfy the fit criteria.

14. An apparatus for forming 2D views of a 3D structure from a number of intersection polylines, the intersection polylines having groups of polyline points such that each intersection polyline has a group of polyline points, the apparatus comprising:
  means for forming a sequence of features from each group of polyline points;
  means for joining consecutive features in each group of polyline points to form a 2D view; and
  wherein the means for joining consecutive features includes:
    means for merging two adjacent features to form a single feature, each adjacent feature having an inner endpoint and an outer endpoint, the inner endpoints of the two adjacent features lying closest together, the outer endpoints of the two adjacent features lying furthest apart;
    means for testing the single feature to determine if the single feature satisfies a fit criteria; and
    means for returning the single feature to two de-merged adjacent features when the fit criteria fails.

15. The apparatus of claim 14 and further including:
  means for identifying the outer endpoints of the two de-merged adjacent features;
  means for identifying an intersection point between the two de-merged adjacent features; and
  means for extending each de-merged feature to include the intersection point when the intersection point lies between the outer endpoints.

16. The apparatus of claim 15 and further comprising means for forming a segment connected to the inner endpoints of the adjacent features when the intersection point lies outside of the outer endpoints.

17. A method for forming 2D views of a 3D structure from a number of intersection polylines, the intersection polylines having groups of polyline points such that each intersection polyline has a group of polyline points, the method comprising the steps of:

forming a sequence of features from each group of polyline points, wherein a feature is a geometric shape selected from a group of geometric shapes, wherein the group of geometric shapes includes line segments and arcs, and wherein operation of the means for forming reduces a measurement noise; and joining consecutive features in each group of polyline points to form a 2D view.

18. A method for forming 2D views of a 3D structure from a number of intersection polylines, the intersection polylines having groups of polyline points such that each intersection polyline has a group of polyline points, the method comprising the steps of:

forming a sequence of features from each group of polyline points;

joining consecutive features in each group of polyline points to form a 2D view; and wherein the step of forming includes:

examining each group of polyline points in a first order to form a sequence of examined groups of polyline points;

for an examined group of polyline points, placing the polyline points from the examined group of polyline points into a sequence of point sets; and forming the sequence of features from the sequence of point sets by forming a feature from the polyline points in each point set.

19. The method of claim 18 wherein the step of placing includes:

forming a point set of the sequence of point sets by identifying a seed point and a number of remaining points in an examined group of polyline points, the seed point defining a first member of the point set;

examining the remaining points in a second order to form a sequence of examined points; and for an examined point, fitting a line to the examined point and each member in the point set, adding the examined point to the point set when the line satisfies a fit criteria, and leaving the examined point and any remaining points that are separated from the seed point by the examined point in the examined group of polyline points when the line fails to satisfy the fit criteria.

20. A method for forming 2D views of a 3D structure from a number of intersection polylines, the intersection polylines having groups of polyline points such that each intersection polyline has a group of polyline points, the method comprising the steps of:

forming a sequence of features from each group of polyline points;

joining consecutive features in each group of polyline points to form a 2D view; and wherein the step of joining consecutive features includes:

merging two adjacent features to form a single feature, each adjacent feature having an inner endpoint and an outer endpoint, the inner endpoints of the two adjacent features lying closest together, the outer endpoints of the two adjacent features lying furthest apart;

testing the single feature to determine if the single feature satisfies a fit criteria; and returning the single feature to two de-merged adjacent features when the fit criteria fails.

21. The method of claim 20 and further including:

identifying the outer endpoints of the two de-merged adjacent features;

identifying an intersection point between the two de-merged adjacent features; and extending each de-merged feature to include the intersection point when the intersection point lies between the outer endpoints.

22. The method of claim 21 and further comprising the step of forming a segment connected to the inner endpoints of the adjacent features when the intersection point lies outside of the outer endpoints.

23. The method of claim 22 and further comprising the step of forming a segment connected to the inner endpoints of the adjacent features when the intersection point lies outside of the outer endpoints.

24. An apparatus for forming 2D views of a 3D structure, the apparatus comprising:

a memory device which stores 3D point data that corresponds to a structure;

a processor, coupled to the memory device, and operative to analyze 3D point data, wherein the processor is operative to identify plane of interest, and wherein the processor is further operative to generate a 2D view of the 3D structure based on a group of intersection polylines, where the group of intersection polylines corresponds to intersections between the plane of interest and the 3D point data that corresponds to the structure, and wherein the processor is operative to form a sequence of features based on the group of intersection polylines, wherein the processor is operative to remove measurement noise from the group intersection polylines.

25. The apparatus of claim 24 further comprising a user interface device coupled with the processor, wherein the identified plane of interest is determined by the processor based on user input through the user interface device.

* * * * *